(12) United States Patent
Lund et al.

(10) Patent No.: US 11,142,284 B2
(45) Date of Patent: Oct. 12, 2021

(54) DRIVE BELT ASSEMBLY FOR AN ELECTRIC VEHICLE

(71) Applicant: Harley-Davidson Motor Company Group, LLC, Milwaukee, WI (US)

(72) Inventors: Ben Matthew Lund, Delafield, WI (US); Senthilkumar Vijayakumar, Menomonee Falls, WI (US); Steven D. Grant, Hartland, WI (US); Paul M. Huettl, West Allis, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 238 days.

(21) Appl. No.: 16/427,947

(22) Filed: May 31, 2019

(65) Prior Publication Data

US 2020/0031428 A1    Jan. 30, 2020

Related U.S. Application Data

(60) Provisional application No. 62/711,715, filed on Jul. 30, 2018.

(51) Int. Cl.
*B62M 6/70* (2010.01)
*B62M 9/06* (2006.01)

(52) U.S. Cl.
CPC .............. *B62M 6/70* (2013.01); *B62M 9/06* (2013.01); *B60Y 2200/12* (2013.01)

(58) Field of Classification Search
CPC B62M 6/70; B62M 9/06; B62K 11/04; B62K 11/00; B60Y 2200/12
USPC .......................................... 474/112; 180/231
See application file for complete search history.

(56) References Cited

U.S. PATENT DOCUMENTS

| | | | |
|---|---|---|---|
| 3,437,162 A | 4/1969 | Diehl | |
| 3,834,246 A | 9/1974 | McGilp | |
| 3,838,606 A | 10/1974 | Scalise | |
| 4,299,582 A | 11/1981 | Leitner | |
| 4,583,962 A * | 4/1986 | Bytzek | F16H 7/1218 474/133 |
| 4,705,494 A | 11/1987 | Gibson | |

(Continued)

FOREIGN PATENT DOCUMENTS

| | | |
|---|---|---|
| DE | 19624311 C1 | 4/1998 |
| DE | 202005002842 U1 | 5/2005 |

(Continued)

*Primary Examiner* — Tony H Winner
(74) *Attorney, Agent, or Firm* — Michael Best & Friedrich LLP

(57) ABSTRACT

A vehicle includes a frame, powertrain unit having output shaft, and a drive sprocket coupled to the output shaft for rotation therewith. A swing arm has a first end pivotably coupled to the frame and a second end supporting a drive wheel of the vehicle. A wheel sprocket is coupled to the drive wheel for rotation therewith, and a flexible final drive member is wrapped around the drive sprocket and the wheel sprocket to establish a driving relationship therebetween, the flexible final drive member forming a loop. An idler bracket is fixed with respect to the frame and supporting both an upper idler and a backside idler. The upper idler is positioned within the loop such that the flexible member engages an upper side of the upper idler. The backside idler is positioned outside the loop such that the flexible member engages an upper side of the backside idler.

19 Claims, 3 Drawing Sheets

(56) References Cited

U.S. PATENT DOCUMENTS

| | | | |
|---|---|---|---|
| 5,078,656 A * | 1/1992 | Brandenstein | F16H 7/1281 |
| | | | 474/112 |
| 5,221,236 A | 6/1993 | Rayner et al. | |
| 5,524,725 A * | 6/1996 | Schantzen | F16H 7/08 |
| | | | 180/182 |
| 5,857,538 A | 1/1999 | Chambers | |
| 6,575,259 B2 | 6/2003 | Buell et al. | |
| 6,866,112 B2 | 3/2005 | Hoechst et al. | |
| 9,469,363 B1 * | 10/2016 | Speicher | B62K 25/04 |
| 2009/0223731 A1 * | 9/2009 | Arnold | B62K 11/04 |
| | | | 180/231 |
| 2014/0256503 A1 * | 9/2014 | Grant | F16H 3/091 |
| | | | 475/343 |

FOREIGN PATENT DOCUMENTS

| | | |
|---|---|---|
| JP | S5455044 U1 | 4/1979 |
| JP | S55138195 U | 10/1980 |
| JP | 0282688 U1 | 6/1990 |
| JP | 4979526 B2 | 7/2012 |

\* cited by examiner

DRIVE BELT ASSEMBLY FOR AN ELECTRIC VEHICLE

CROSS-REFERENCE TO RELATED APPLICATIONS

This application claims priority to U.S. Provisional Patent Application No. 62/711,715, filed Jul. 30, 2018, the entire contents of which are incorporated by reference herein.

BACKGROUND

The present invention relates to vehicle final drive assemblies having a flexible loop member such as a belt or chain, and more particularly the drive line path established by such a flexible loop member.

SUMMARY

The present invention provides, in one independent aspect, a vehicle including a frame, a powertrain unit coupled to the frame and having an output shaft rotatable in response to operation of the powertrain unit, and a drive sprocket coupled to the output shaft for rotation therewith. The vehicle further includes a swing arm having a first end pivotably coupled to the frame and a second end supporting a drive wheel of the vehicle, a wheel sprocket coupled to the drive wheel for rotation therewith, and a flexible final drive member wrapped around the drive sprocket and the wheel sprocket to establish a driving relationship therebetween, the flexible final drive member forming a loop. An idler bracket is fixed with respect to the frame and supporting both an upper idler and a backside idler. The upper idler is positioned within the loop such that the flexible final drive member engages an upper side of the upper idler. The backside idler is positioned outside the loop such that the flexible final drive member engages an upper side of the backside idler.

The present invention provides, in another independent aspect, a vehicle including a frame, a powertrain unit coupled to the frame and having an output shaft rotatable in response to operation of the powertrain unit, and a drive sprocket coupled to the output shaft for rotation therewith. The vehicle further includes a swing arm having a first end pivotably coupled to the frame and a second end supporting a drive wheel of the vehicle, a wheel sprocket coupled to the drive wheel for rotation therewith, and a flexible final drive member wrapped around the drive sprocket and the wheel sprocket to establish a driving relationship therebetween, the flexible final drive member forming a loop. A first idler is positioned within the loop to intersect a tangent line extending between respective upper portions of the drive sprocket and the wheel sprocket such that an upper run of the flexible final drive member is deflected into a serpentine configuration. The first idler is concentric with a swing arm pivot axis about which the swing arm first end is coupled to the frame such that the first idler and the wheel sprocket define a fixed center-to-center distance for the full range of motion of the swing arm.

The present invention provides, in another independent aspect, a vehicle including a frame, a powertrain unit coupled to the frame and having an output shaft rotatable in response to operation of the powertrain unit, and a drive sprocket coupled to the output shaft for rotation therewith. The vehicle further includes a swing arm having a first end pivotably coupled to the frame and a second end supporting a drive wheel of the vehicle, a wheel sprocket coupled to the drive wheel for rotation therewith, and a flexible final drive member wrapped around the drive sprocket and the wheel sprocket to establish a driving relationship therebetween. The flexible final drive member forms a loop including a drive side and a slack side. An idler is positioned below the loop to intersect a tangent line extending between respective lower portions of the drive sprocket and the wheel sprocket such that the slack side of the flexible final drive member is deflected into a serpentine configuration. The idler is fixedly positioned relative to the drive sprocket.

Other aspects of the invention will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Figure 1:
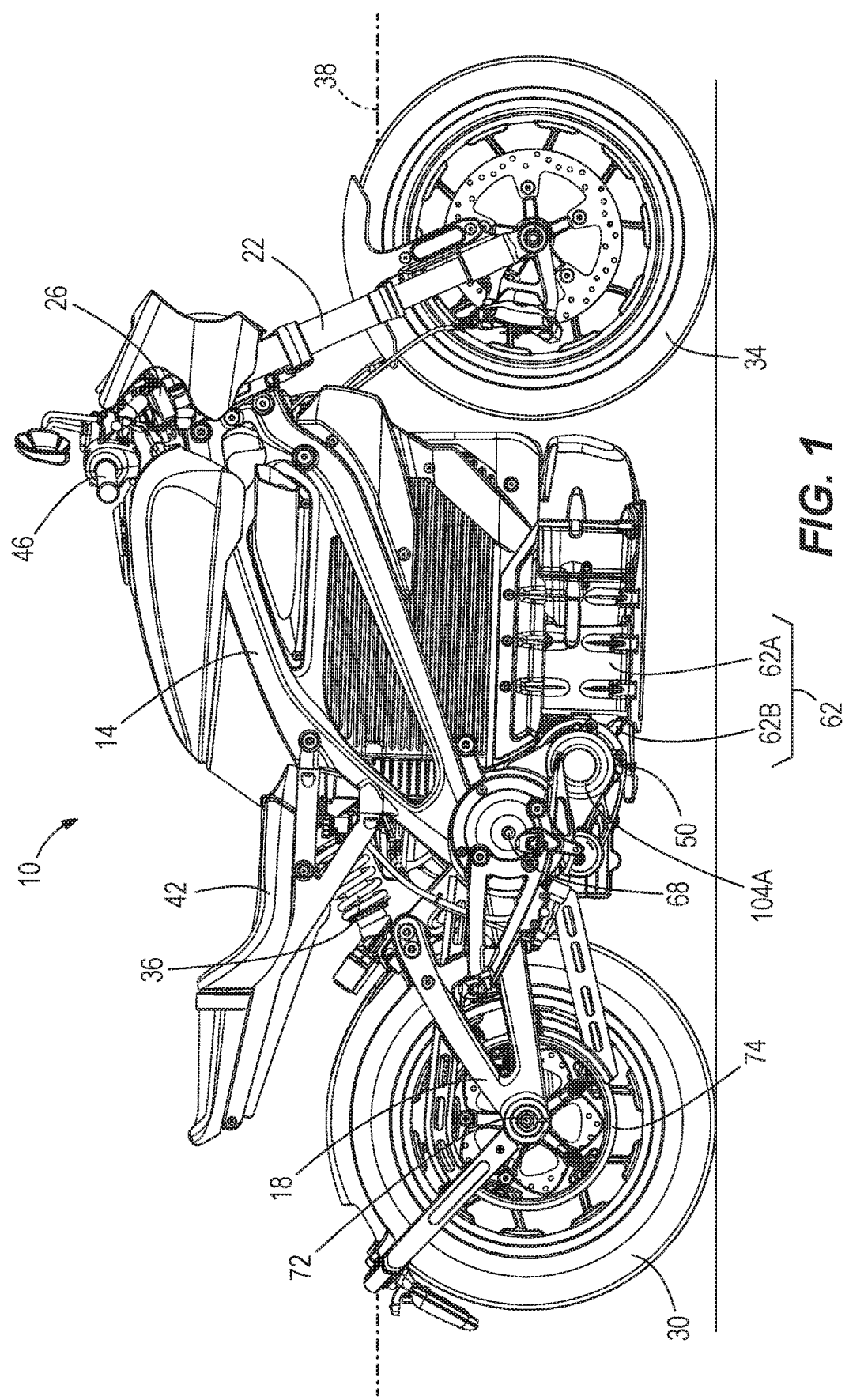
FIG. 1 is a perspective view of an electric vehicle including a drive belt assembly according to one embodiment of the disclosure.

FIG. 1 illustrates an electric vehicle in the form of a motorcycle 10. The motorcycle 10 includes a frame 14, a swing arm 18 pivotally coupled to a rear portion of the frame 14, and a front fork 22 rotatably coupled to a front portion of the frame 14 at a steering head 26. A rear wheel 30 is coupled to the swing arm 18, and a front wheel 34 is coupled to the front fork 22. The rear wheel 30 and the front wheel 34 support the frame 14 for movement along the ground. The front fork 22 includes internal suspension components providing resilient support and motion damping. A suspension unit 36 (e.g., including a coil spring and coaxial shock absorber) similarly provide resilient support and motion damping for the swing arm 18, as the suspension unit 36 forms a separate connection between the swing arm 18 and the frame 14. The illustrated motorcycle 10 is a two-wheeled, single-track vehicle. However, the vehicle can take other forms in other embodiments, including for example, having a pair of laterally-spaced rear wheels and/or a pair of laterally-spaced front wheels. The motorcycle 10 defines a longitudinal axis 38 that extends centrally through the motorcycle 10 along the length of the motorcycle 10. In other words, the longitudinal axis 38 extends within a longitudinal mid-plane that bisects the motorcycle 10 along its length. A straddle seat 42 overlies at least a portion of the frame 14 for supporting at least one rider, and the motorcycle 10 includes handlebars 46 coupled to the front fork 22 via the steering head 26 for steering the front wheel 34. Various controls and indicators for operating the motorcycle 10 may be located on the handlebars 46.

The motorcycle 10 further includes a final drive assembly 50 including a flexible serpentine loop member (e.g., final drive belt 54 as shown) to maximize drive efficiency from a powertrain unit 62 to the driven wheel(s), which is the rear wheel 30 in the illustrated example. A drive line is defined by the path of the serpentine belt 54. Due to the orientation of the drive line, the serpentine belt 54 maintains constant tension throughout the range of travel of the rear wheel 30 provided by the swing arm 18. Although the flexible serpentine loop member 54 can be constructed of a resilient material (e.g., reinforced rubber or other polymer), the disclosure may also apply to a flexible serpentine loop member in the form of a series of rigid chain-linked members (e.g., pinned metal chain link members forming a flexible roller chain). The final drive assembly 50 includes an idler bracket 66 fastened to the powertrain unit 62 as described further below.

Figure 2:
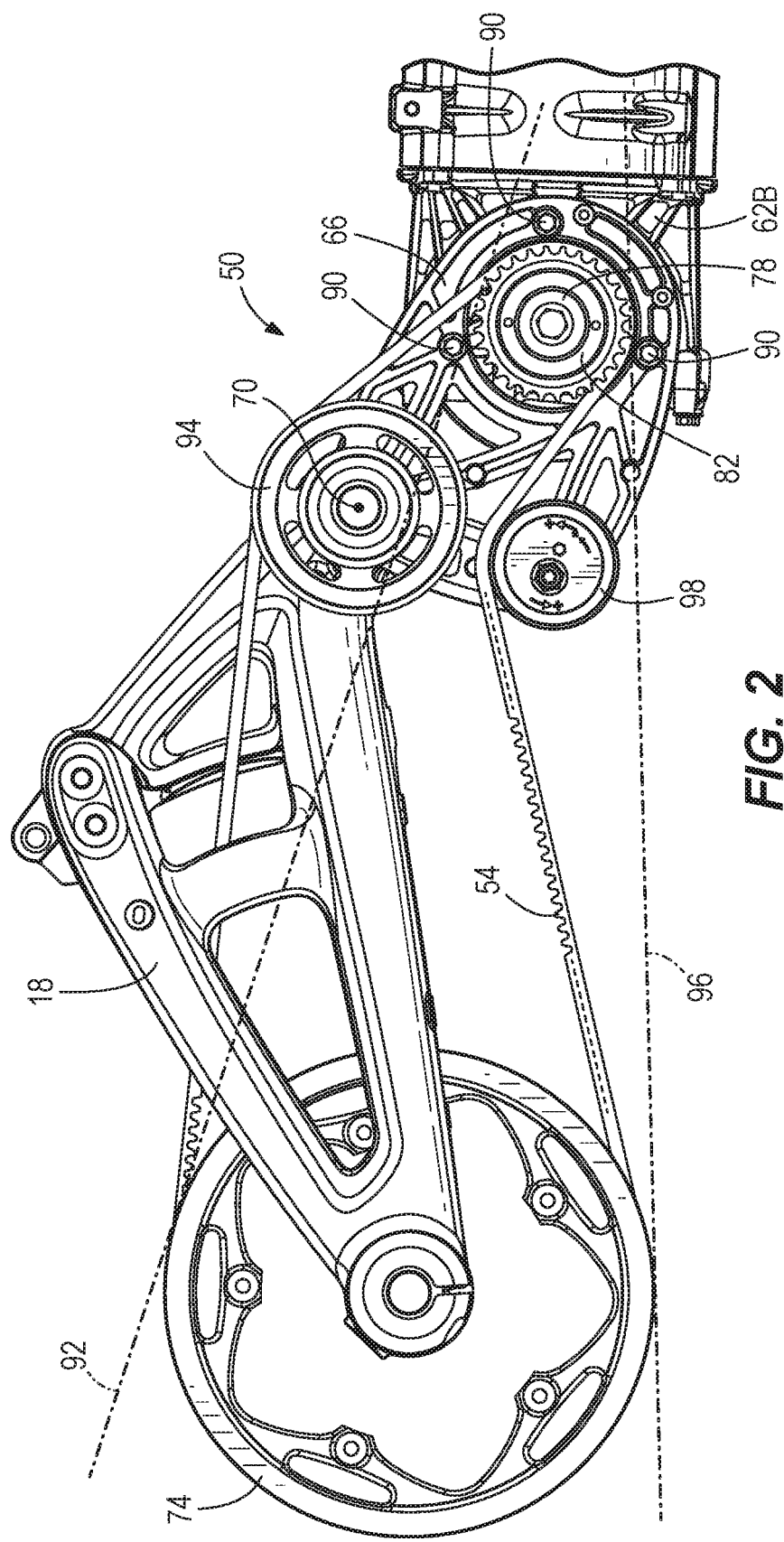
FIG. 2 is a side view of a portion of the electric vehicle of FIG. 1, illustrating the drive belt assembly of the electric vehicle.

With reference to FIG. 2, the swing arm 18 is pivotably mounted to a rear portion of the frame 14 about a pivot shaft 68 that defines a swing arm pivot axis 70. The idler bracket 66 includes a first or upper portion supporting the pivot shaft 68. The idler bracket 66 can have a trellis construction extending rearwardly to the first or upper portion from a ring portion that is secured to the powertrain unit 62. The pivotable swing arm 18 allows the rear wheel 30 to swing up and down with respect to the frame 14. The swing arm 18 couples to the rear wheel 30 at a rear wheel axle 72, which has a fixed spacing from the pivot axis 70. In other words, there is no change is the distance between the pivot shaft 68 and the rear wheel axle 72 throughout pivoting movement of the swing arm 18 with respect to the frame 14. A rear wheel sprocket 74 is arranged on the rear wheel axle 72 and is fixedly secured so as to rotate with the rear wheel 30 at all times. The final drive belt 54 wraps around a rear portion of the rear wheel sprocket 74 such that the rear wheel sprocket 74 is positioned within the loop of the belt 54 and is operably rotated by movement of the belt 54 so as to rotate the wheel 30 and propel the motorcycle 10.

Figure 3:
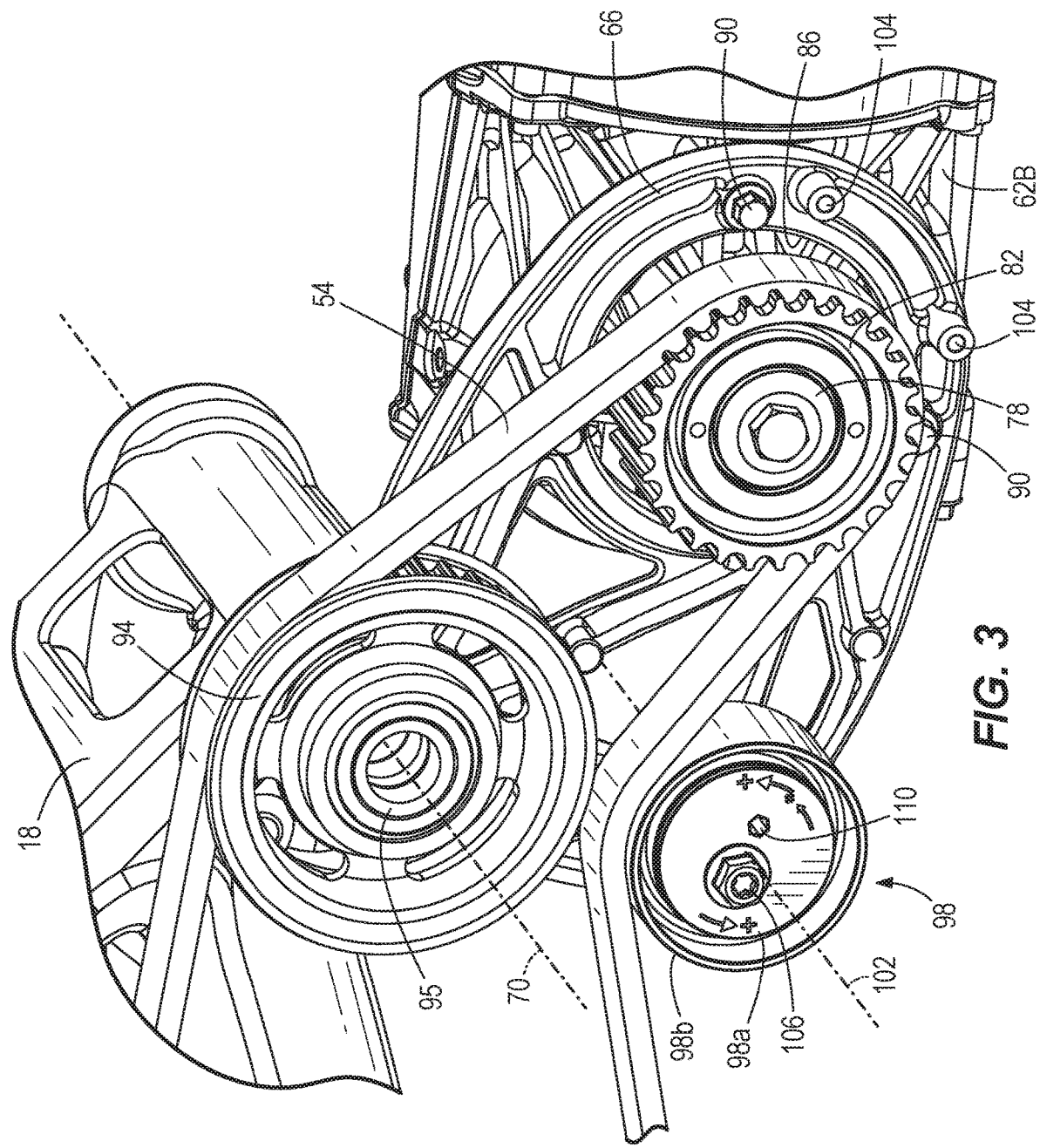
FIG. 3 is an enlarged perspective view of an idler bracket of the drive belt assembly of FIG. 2.

The powertrain unit 62 can include a motor 62A (e.g., electric motor, in some cases a synchronous permanent magnet AC motor) and may further include a gearbox 62B arranged to receive power from the motor 62A and transmit power to the final drive assembly 50. The gearbox 62B can be a fixed, single-speed gearbox or a multi-speed gearbox providing changeable gear ratios between the motor 62A and the final drive assembly 50. The powertrain unit 62 includes an output shaft 78 arranged to extend in the transverse direction of the motorcycle 10. The output shaft 78 can be the output component of the gearbox 62B. The gearbox 62B can be a right-angle gearbox having an input shaft (not shown) that is arranged to extend parallel to the longitudinal direction of the motorcycle 10. For example, the motor 62A can be longitudinally oriented on the motorcycle 10 so that an output shaft thereof extends parallel to the longitudinal direction. In some constructions, the powertrain unit 62 may include only the motor 62A and no separate transmission or gearbox. A drive sprocket 82 is mounted on and fixed for rotation with the output shaft 78. The drive sprocket 82 is only moveable in a rotational direction, and is otherwise fixed in position with respect to the frame 14. The final drive belt 54 wraps around a front portion of the drive sprocket 82 such that the drive sprocket 82 is positioned within the loop of the belt 54 and operable to exert a pulling force in an upper run of the belt 54 in response to operation of the motor 62A. The output shaft 78 is parallel to and offset from the pivot axis 70 of the swing arm 18. As shown in FIG. 3, the drive sprocket 82 is further positioned within an aperture 86 of the idler bracket 66. As shown in FIGS. 2-3, the idler bracket 66 is mounted (e.g., fixed) to the powertrain unit 62, particularly the gearbox 62B, at multiple (e.g., three) connection points. As illustrated, the connection points are established by individual fasteners 90, which can be threaded fasteners. The connection points can be distributed along a ring portion of the idler bracket 66 and may be distributed about a common pitch circle diameter.

The idler bracket 66 further supports an upper idler 94 mounted to the idler bracket 66 on the pivot axis 70. The upper idler 94 and the rear wheel sprocket 74 define a fixed center-to-center distance, regardless of swing arm orientation, since each one has a fixed position along the swing arm 18. The upper idler 94 can be supported on the pivot shaft 68 by a bearing 95. The upper idler 94 is a non-driven sprocket provided in a fixed position and freely rotatable about the pivot axis 70. The upper idler 94 rotates in response to rotation of the drive sprocket 82 to move the belt 54. The pivot axis 70 is rearward (defined with reference to a forward travel direction of the motorcycle 10) and upwards with respect to the output shaft 78. The upper idler 94 is positioned rearward and upwards with respect to the drive sprocket 82. A tangent line 92 indicates the projected belt path or drive line on the upper run of the final drive belt 54 between the drive sprocket 82 and the rear wheel sprocket 74. The upper idler 94 intersects the tangent line 92 so as to reorient the drive line upward and create a serpentine path. The final drive belt 54 contacts an upper side of the upper idler 94 due to the placement of the idler 94 within the loop of the belt 54. In the illustrated embodiments, the upper idler 94 is a sprocket with a plurality of teeth, forming a toothed outer surface. The teeth can form a complementary fit with a plurality of teeth formed along the length of the belt 54 (some of the teeth are shown in FIG. 2). However, the upper idler 94 may be any type of idler, such as a smooth roller. Placement of the upper idler 94 and the corresponding belt path sets the squat characteristics of the motorcycle 10 resulting from acceleration.

The idler bracket 66 additionally supports a backside idler 98 coupled thereto. The backside idler 98 includes an internal body, or bearing, 98a and a wheel 98b surrounding the body 98a. The body 98a is fixedly secured to the idler bracket 66 and defines a central axis 102. The wheel 98b is axially fixed and freely rotatable on the body 98a about the central axis 102. An upper extent of the backside idler 98 (wheel 98b) is positioned at a height above the output shaft 78. A lower extent of the backside idler 98 (wheel 98b) does not extend below a lower extent of the drive sprocket 82. In alternative embodiments, the backside idler 98 may be a sprocket including a plurality of teeth rather than a wheel having a smooth outer surface. The backside idler 98 is positioned rearwards with respect to the drive sprocket 82. The backside idler 98 is positioned below the swing arm pivot axis 70. The outer diameter of the backside idler 98 can be smaller than the outer diameter of the upper idler 94 as shown. A tangent line 96 indicates the projected belt path or drive line on the lower run of the belt 54 between the drive sprocket 82 and the rear wheel sprocket 74. The backside idler 98 intersects the tangent line 98 so as to reorient the drive line upward and create a serpentine path. The belt 54 contacts an upper side of the backside idler 98 due to the placement of the backside idler 98 outside of the loop formed by the belt 54. The lower run of the belt 54 is prone to slack during the application of drive power, since power is applied to the wheel sprocket 74 by tension in the upper run, or "drive side," of the belt 54 as it is "pulled" by rotation of the drive sprocket 82. Adding the backside idler 98 affords the ability to tension the lower run, or "slack side," of the belt 54. As the belt 54 travels along the backside idler 98, the body 98a remains stationary while the wheel 98b freely rotates. In the illustrated construction, the idler bracket 66 further includes one or more mounting features 104 (e.g., threaded apertures, optionally located within projecting mounting bosses) for mounting a final drive cover 104A. The cover 104A is shown in FIG. 1 and covers, at least from the side, one or both of the drive sprocket 82 and the upper idler 94. The cover 104A can fully or partially cover one or both of the drive sprocket 82 and the upper idler 94, along with the points of engagement with the belt 54. The cover 104A may additionally extend inboard to at least partially cover upper, forward-facing, and/or lower surfaces of the aforementioned components.

The backside idler 98 mounts to the idler bracket 66 about a mounting bolt 106. A central axis of the bolt 106 is offset from the central axis 102 of the backside idler 98, thus enabling an eccentric rotation of the backside idler 98 around the bolt 106. Eccentric rotation of the backside idler 98 controls the amount of offset between the actual path of the belt 54 and the theoretical straight belt path between the drive sprocket 82 and the rear wheel sprocket 74 illustrated by the tangent line 96. As shown in FIG. 3, the backside idler 98 further includes an idler adjustment feature 110 adjacent the central axis 102 and the bolt 106. The idler adjustment feature 110 is a hex-shaped indentation on the backside idler 98 capable of being received by a tool (e.g., an Allen key, a screwdriver, etc.) in order to rotate the backside idler 98. Specifically, with the bolt 106 loosened, a user may adjust tension of the belt 54 by rotating the backside idler 98 around the mounting bolt 106 via the adjustment feature 110. Once a desired belt tension is achieved, the idler mounting bolt 106 is torqued down to prohibit further movement of the backside idler 98 with respect to the idler bracket 66 during operation. Thus, in the operational configuration, the backside idler 98 is neither movable nor resiliently-biased against the belt 54.

As shown in FIG. 2, the drive line of the belt 54 is positioned specifically to maximize drive efficiency. The belt 54 wraps around the drive sprocket 82, contacts an upper side of the upper idler 94, wraps around the rear wheel sprocket 74, and contacts an upper side of the backside idler 98. Therefore, the upper idler 94 is mounted inside the belt loop and the backside idler 98 is mounted outside the belt loop. Stated another way, an interior surface of the belt 54 is applied to the drive sprocket 82, the upper idler 94, and the wheel sprocket 74, while an opposite exterior surface of the belt 54 is applied to the backside idler 98. Due to the positioning of the belt 54 on the upper idler 94 and the backside idler 98, neither the upper nor lower belt runs extend straight between the drive sprocket 82 and the rear wheel sprocket 74. As previously stated, the upper idler 94 is positioned on the pivot axis 70. When the swing arm 18 pivots and the rear wheel sprocket 74 moves in an arc about the pivot axis 70, tension in the belt 54 is maintained as the belt 54 simply wraps to a greater or lesser extent around the upper sides of the upper and backside idlers 94, 98. In this way, belt tension can be maintained nearly constant through the entire range of swing arm movement. Furthermore, positioning the belt 54 on the upper side of the backside idler 98, which is not aligned with either the upper idler 94 or the drive sprocket 82, raises the lower belt path vertically upwards. The addition of the backside idler 98 adds tension within the lower side (e.g., slack side) of the belt 54. The backside idler 98 further enhances the compactness of the drive line formed by the belt 54, increasing clearance on a lower side thereof.

Although the disclosure has been described in detail with reference to certain preferred embodiments, variations and modifications exist within the scope and spirit of one or more independent aspects of the disclosure as described.

What is claimed is:

1. A vehicle comprising:
   a frame;
   a powertrain unit coupled to the frame and having an output shaft rotatable in response to operation of the powertrain unit;
   a drive sprocket coupled to the output shaft for rotation therewith;
   a swing arm having a first end pivotably coupled to the frame and a second end supporting a drive wheel of the vehicle;
   a wheel sprocket coupled to the drive wheel for rotation therewith;
   a flexible final drive member wrapped around the drive sprocket and the wheel sprocket to establish a driving relationship therebetween, the flexible final drive member forming a loop; and
   an idler bracket fixed with respect to the frame and supporting both an upper idler and a backside idler,
   wherein the upper idler is positioned within the loop such that the flexible final drive member engages an upper side of the upper idler, and wherein the backside idler is positioned outside the loop such that the flexible final drive member engages an upper side of the backside idler.

2. The vehicle of claim 1, wherein the powertrain unit includes a motor and a gearbox positioned rearward of the motor, the output shaft extending from the gearbox, and wherein the idler bracket is secured to the gearbox.

3. The vehicle of claim 1, wherein the idler bracket has a ring portion surrounding the output shaft.

4. The vehicle of claim 1, wherein the vehicle is a two-wheeled single-track vehicle.

5. The vehicle of claim 1, wherein the upper idler is positioned by the idler bracket concentric with a swing arm pivot axis about which the swing arm first end is coupled to the frame.

6. The vehicle of claim 1, wherein the backside idler is eccentrically and adjustably supported by the idler bracket.

7. The vehicle of claim 1, wherein the upper idler defines an outer diameter that is greater than an outer diameter defined by the backside idler.

8. A vehicle comprising:
   a frame;
   a powertrain unit coupled to the frame and having an output shaft rotatable in response to operation of the powertrain unit;
   a drive sprocket coupled to the output shaft for rotation therewith;
   a swing arm having a first end pivotably coupled to the frame and a second end supporting a drive wheel of the vehicle;
   a wheel sprocket coupled to the drive wheel for rotation therewith;
   a flexible final drive member wrapped around the drive sprocket and the wheel sprocket to establish a driving relationship therebetween, the flexible final drive member forming a loop; and
   a first idler positioned within the loop to intersect a tangent line extending between respective upper portions of the drive sprocket and the wheel sprocket such that an upper run of the flexible final drive member is deflected into a serpentine configuration, wherein the first idler is concentric with a swing arm pivot axis about which the swing arm first end is coupled to the frame such that the first idler and the wheel sprocket define a fixed center-to-center distance for the full range of motion of the swing arm.

9. The vehicle of claim 8, further comprising a second idler positioned outside the loop in contact with a lower run of the flexible final drive member to deflect the lower run into a serpentine configuration.

10. The vehicle of claim 9, wherein the first and second idlers are supported on a common bracket.

11. The vehicle of claim 9, wherein the second idler has an upper extent positioned at a height above the output shaft.

12. The vehicle of claim 9, wherein the second idler is eccentrically and adjustably supported on the motorcycle.

13. The vehicle of claim 9, wherein the first idler defines an outer diameter that is greater than an outer diameter defined by the second idler.

14. The vehicle of claim 8, wherein the first idler is an idler sprocket having a toothed outer surface.

15. The vehicle of claim 8, wherein the vehicle is a two-wheeled single-track vehicle.

16. A vehicle comprising:
a frame;
a powertrain unit coupled to the frame and having an output shaft rotatable in response to operation of the powertrain unit;
a drive sprocket coupled to the output shaft for rotation therewith;
a swing arm having a first end pivotably coupled to the frame and a second end supporting a drive wheel of the vehicle;
a wheel sprocket coupled to the drive wheel for rotation therewith;
a flexible final drive member wrapped around the drive sprocket and the wheel sprocket to establish a driving relationship therebetween, the flexible final drive member forming a loop including a drive side and a slack side; and
an idler positioned below the loop to intersect a tangent line extending between respective lower portions of the drive sprocket and the wheel sprocket such that the slack side of the flexible final drive member is deflected into a serpentine configuration,
wherein the idler is fixedly positioned relative to the drive sprocket, and
wherein the idler has an upper extent positioned at a height above the output shaft.

17. The vehicle of claim 16, wherein the idler is fixedly positioned by an eccentric bolt, and loosening of the eccentric bolt provides adjustment of an intersection of the idler with the tangent line.

18. The vehicle of claim 16, further comprising an additional idler positioned within the loop to intersect a tangent line extending between respective upper portions of the drive sprocket and the wheel sprocket, the additional idler positioned concentric with a swing arm pivot axis about which the swing arm first end is coupled to the frame.

19. The vehicle of claim 16, wherein the vehicle is a two-wheeled single-track vehicle.

\* \* \* \* \*